March 6, 1973   P. GOSGER   3,719,569
METHOD AND APPARATUS FOR COUNTERSINKING
CAVITIES IN A WORKPIECE
Filed Oct. 13, 1970   2 Sheets-Sheet 1
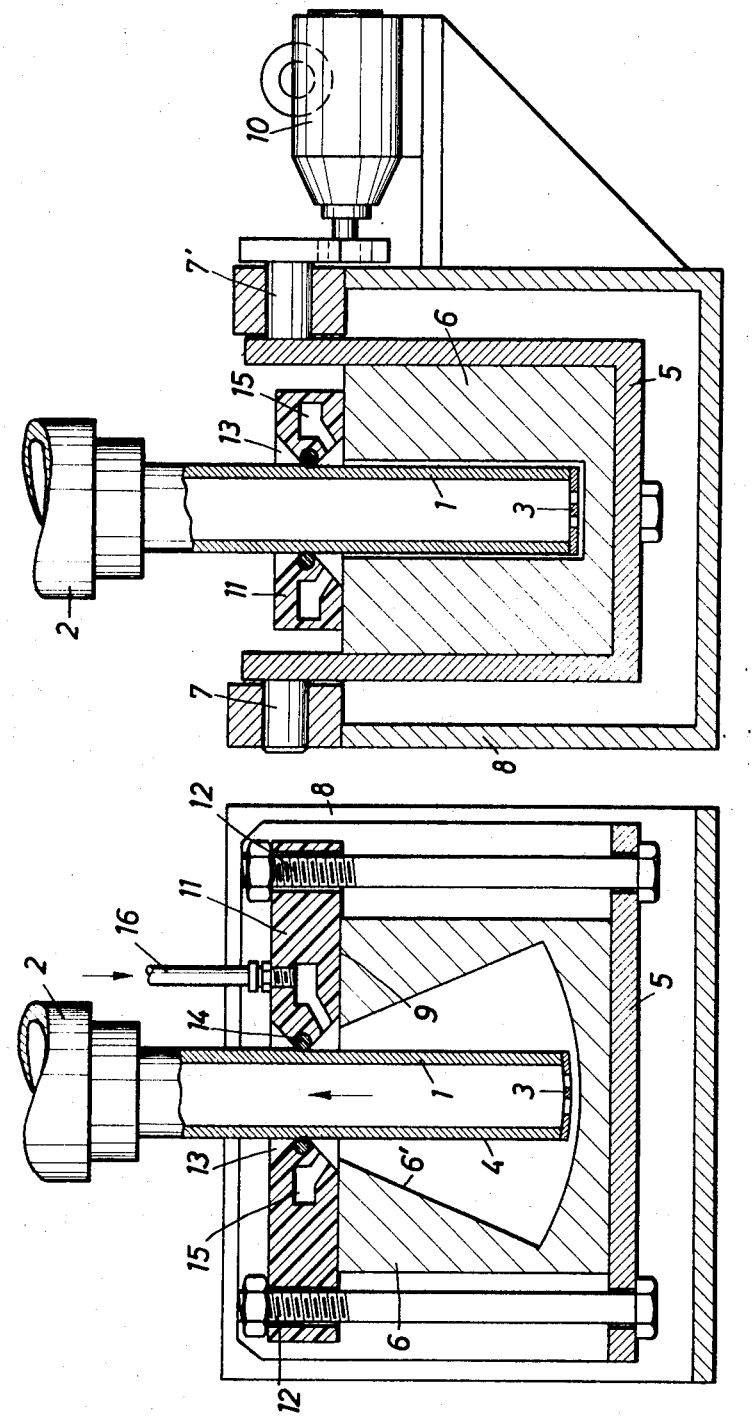
Inventor:
PETER GOSGER
BY Cushman, Darby & Cushman
ATTORNEYS

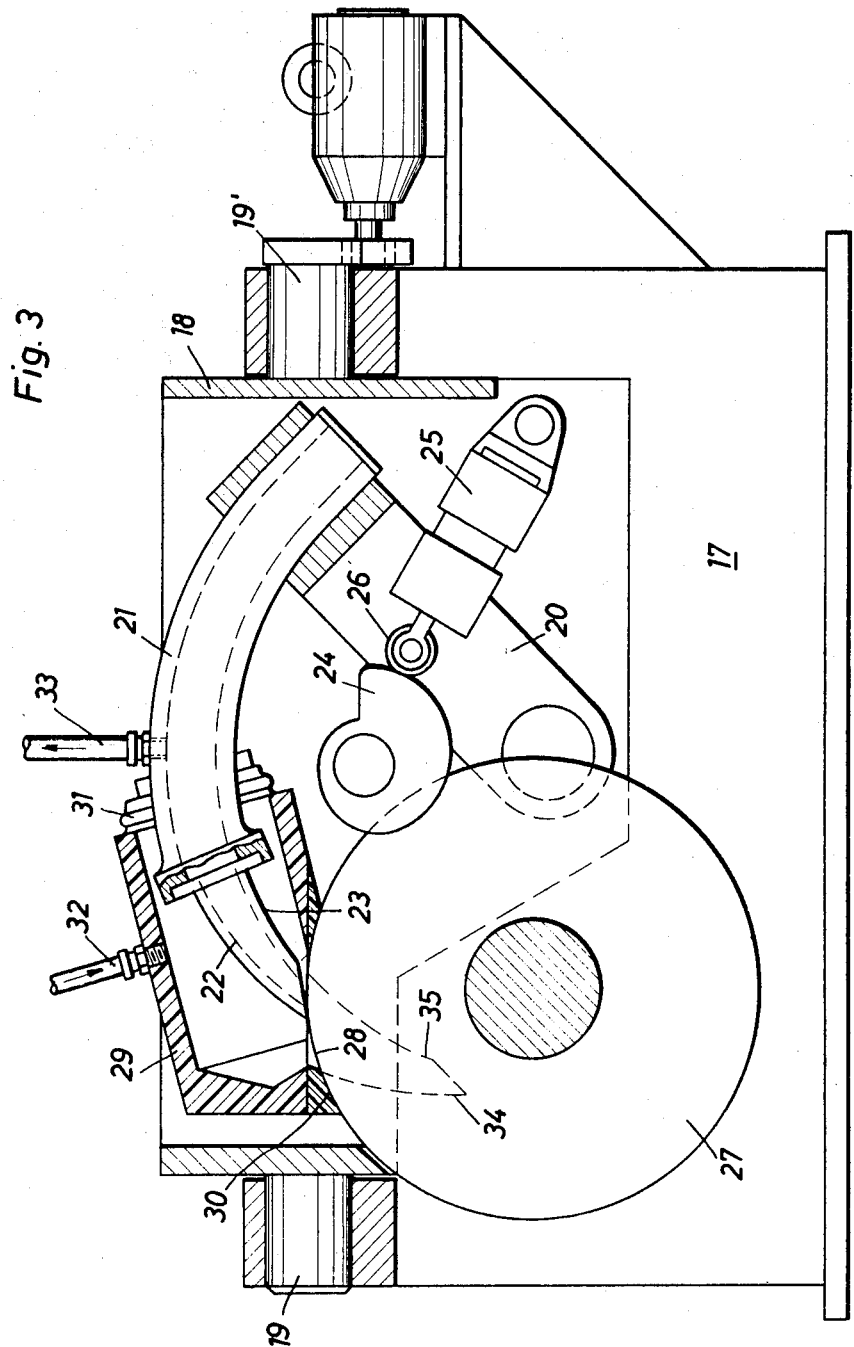

United States Patent Office 3,719,569
Patented Mar. 6, 1973

3,719,569
METHOD AND APPARATUS FOR COUNTERSINKING CAVITIES IN A WORKPIECE
Peter Gosger, Remscheid-Luttringhausen, Germany, assignor to AEG-Elotherm G.m.b.H., Remscheid Hasten, Germany
Filed Oct. 13, 1970, Ser. No. 80,280
Int. Cl. B23p 1/00
U.S. Cl. 204—129.55
3 Claims

ABSTRACT OF THE DISCLOSURE

A method and apparatus for electrochemically countersinking a cavity having at least one cross sectional dimension which increases with depth. In one embodiment an electrode tool is infed into a workpiece and moved relative to the cavity in a pendulum motion. In a further embodiment, an arcuate hollow tool is mounted in a tool holder which follows a rotating cam member to infeed the electrode into the workpiece.

---

This invention relates to a method and apparatus for electrochemically countersinking into a workpiece a three-dimensional cavity having at least a single cross sectional dimension which increases with depth.

Conventional techniques for electrochemically countersinking cavities include feeding towards a workpiece a suitably shaped electrode tool held at a potential that is negative relative to the workpiece potential and maintaining a flowing electrolyte between the electrode and the workpiece. As the electrode moves into the workpiece, the material of the workpiece is progressively and electrochemically eroded until finally the cavity formed in the workpiece conforms approximately to the shape of the electrode tool. Processes of this kind have become increasingly important in producing workpieces having complicated geometry from high strength materials, previously done generally by copy milling techniques.

In conventional methods of electrochemical countersinking, as in copy milling, the dimensions of the cavities thus formed necessarily decrease with increasing depth. When cavities are required in which at least one dimension increases, rather than decreases, with depth, the usual approach is to produce such workpieces in two or more parts, thus increasing production costs and usually also reducing the mechanical strength of the finished part, thereby increasing the risk of fracture.

The present invention relates to a method of and apparatus for electrochemically countersinking cavities of which at least one cross-sectional dimension increases with increasing depth. More particularly, according to one embodiment of the invention, the electrode tool while being infed along either a linear or a circular path primarily performs a planar motion in relation to the work and simultaneously with the infeeding motion a pendulum motion is generated between the electrode tool and the workpiece.

This pendulum motion may preferably take place in a plane which is normal to the plane of infeed of the electrode tool, the axis of the pendulum motion being located close to the workpiece surface which is being electrochemically countersunk.

Embodiments of the invention are hereinafter described and illustrated in the accompanying drawings of which FIG. 1 is a front sectional view of a first embodiment in which the infeeding motion of the electrode is linear, FIG. 2 is a side sectional view of the embodiment of FIG. 1, and FIG. 3 is a schematic representation of another embodiment of the invention which is particularly suitable for the production of impellers for radial compressors.

Referring to FIGS. 1 and 2, a conventional electrochemical eroding arrangement is shown which comprises a hollow tubular electrode tool 1 mounted in a tool holder 2 which is schematically represented. Tool holder 2 is arranged to feed the electrode tool 1 rectilinearly along the axis of tool 1 toward and away from workpiece 6. The eroding end of the tubular electrode tool 1 is closed by a perforated plate 3 and the external wall of tool 1 is covered with an electrically insulating coating 4 as shown. Workpiece 6 is mounted in a support 5 which, as shown, is hingeably suspended by trunnions 7 and 7' from frame 8. The axis of rotation of support 5 and workpiece 6 is preferably close to the surface 9 of the workpiece into which the cavity is to be electrochemically countersunk. A pendulum drive 10 is coupled to trunnion 7' and driven by a motor (not shown) for causing workpieces to follow a pendulum path.

The portion of surface 9 of the workpiece which is not to be eroded is covered by an electrolyte mask 11 which also serves for fixing the workpiece 6 in the support 5 by means of bolts 12. Mask 11 is provided with an opening 13 which has an internal surface defined by a twin cone with a resilient sealing ring 14 embedded at the level of the hinge axis so that ring 14 seals the recirculating electrolyte in the cavity. Mask 11 is further provided with an annular admission channel 15 through which the electrolyte enters the cavity from pipe 16. The electrolyte leaves the cavity via the hollow interior of electrode tool 1.

To machine a workpiece the blank workpiece 6 is first secured to support 5 with the aid of electrolyte mask 11 and bolts 12. The bottom end of electrode tool 1 is then introduced into sealing ring 14 so that the eroding end is adjacent surface 9. After the electrolyzing voltage has been applied and the circulation of the electrolyte has been started, electrode tool 1 is lowered towards workpiece 6 at a prescribed speed and at the same time a pendulum motion is applied between workpiece 6 and electrode tool 1 by pendulum drive 10.

As electrode tool 1 continues to feed into workpiece 6, a cavity 6' is eroded in the workpiece and, as shown in FIG. 1, the desired dimension of the cross-sectional area increases with increasing depth in the cavity, the rate of increase being a function of the pendulum motion imparted to workpiece 6. The insulating coating 4 on electrode tool 1 ensures that no electrolyzing current can flow between the external peripheral surface of tool 1 and the lateral contour of the cavity 6' so that in these areas continuous removal of material leading to an unwanted conical enlargement of cavity 6' is avoided. It will, of course, be understood that such erosion can be permitted to take place, if desired.

Referring now to the embodiment of FIG. 3, toolhead 18 is pendantly suspended in machine frame 17 by trunnions 19 and 19', and a pendulum motion may be generated between toolhead 18 and a workpiece on these trunnions. Toolhead 18 holds a rotatably mounted toolholder 20 which has an arcuately curved bushing 21 for the reception of a similarly arcuately curved hollow electrode tool 22 of substantially rectangular cross-section which gradually tapers to a point. The slightly concave outer face on the inside of electrode tool 22 and its two side faces are preferably covered with an electrically insulating coating 23. For infeeding electrode tool 22, toolhead 18 further contains a rotatably mounted cam 24 which is driven by a suitable electric motor (not shown) through a reduction gear. One end of a hydraulic actuator cylinder 25 is mounted in toolhead 18 and the other end is attached to the shaft of roller 26 which is also rotatably mounted in toolholder 20 so that it maintains roller 26 in contact with cam 24.

Cylindrical workpiece 27, which is to be electrochemically eroded to produce an impeller for a radial compressor and from which the impeller blades are to be machined from a solid mass of metal, is disposed in machine frame 17 and mounted in a suitable workpiece holder (not shown) so that, at the end of an electrolyzing process, a subsequent indexing rotation of the workpiece holder will position the workpiece for the next eroding operation. Workpiece 27 is mounted so that the pendulum axis of the toolhead 18 is adjacent the portion 28 of the surface of the workpiece 27 into which the countersink is to be machined, and is as close to portion 28 as possible. An electrolyte mask 29 which includes a chamber for receiving tool 22 seals the circulating electrolyte firstly from the portion 30 of workpiece 27 which is not to be eroded and, secondly, by means of a sealing sock 31, from bushing 21. Electrolyte is supplied to the chamber via a pipe 32 which is attached to electrolyte mask 29 and exits through hollow bushing 21 and pipe 33.

At the time the electrolytic machining process begins, electrode tool 22 is approximately in the position shown in FIG. 3. As soon as a suitable potential has been applied and the circulation of the electrolyte started, the driving motors for the pendulum motion and that of the cam 24 are activated. Cam 24 then rotates counter-clockwise, causing electrode tool 22 to feed on a circular arc in conformity with the gradual decrease in the effective radius of cam 24.

The circular arc feeding motion of electrode 22 and its superimposed pendulum motion in relation to workpiece 27 in a plane normal to the plane of feed generates a cavity in workpiece 27 havin gthe contours 34 and 35, the cross-section of the cavity increasing in a direction normal to the plane of the paper as the countersunk cavity becomes deeper. Since the slightly convex external side face of electrode tool 22 is not insulated, an electrolyzing current continues to flow between this face and the opposite wall of the cavity causing the latter to widen in this direction as indicated by contour 34, thereby permitting the tapered electrode tool 22 to continue feeding into the workpiece.

Many changes and modifications in the above embodiments of the invention can, of course, be made without departing from the scope of the invention. Accordingly, that scope is intended to be limited only by the scope of the appended claims.

What is claimed is:

1. A method of electrochemically countersinking in a workpiece a cavity wherein one of cross-sectional dimensions thereof increases with depth comprising the steps of feeding an electrode tool so that it primarily performs a planar motion in a given stationary plane and at the same time an arcuate oscillatory motion is generated between the workpiece and said given plane with said arcuate oscillatory motion contained in a plane normal to said given plane circulating an electrolyte through the region between said workpiece and said tool and applying an eroding voltage between said workpiece and said tool.

2. A method according to claim 1 wherein the planar motion of the electrode tool is a rectilinear movement.

3. A method according to claim 1 wherein the planar motion of the electrode tool is an arcuate movement.

References Cited

UNITED STATES PATENTS

| | | | |
|---|---|---|---|
| 3,041,442 | 6/1962 | Ullmann et al. | 204—224 UX |
| 3,461,267 | 8/1969 | O'Connor | 204—143 MX |
| 3,564,190 | 2/1971 | Kandajan | 204—143 MX |
| 3,058,895 | 10/1962 | Williams | 204—143 M |
| 3,565,775 | 2/1971 | Bouchet et al. | 204—143 M |
| 3,306,838 | 2/1967 | Johnson | 204—143 M |
| 3,060,114 | 10/1962 | Sanders | 204—225 |

JOHN H. MACK, Primary Examiner

R. J. FAY, Assistant Examiner

U.S. Cl. X.R.

204—129.6, 129.7, 224 M

UNITED STATES PATENT OFFICE
CERTIFICATE OF CORRECTION

Patent No. 3,719,569          Dated March 6, 1973

Inventor(s) PETER GOSGER

It is certified that error appears in the above-identified patent and that said Letters Patent are hereby corrected as shown below:

Column 1, in the heading line 5, after "Germany", insert -- claims foreign priority  Germany   P  19 58702.1  Nov. 22, 1969 -- .

Signed and sealed this 20th day of November 1973.

(SEAL)
Attest:

EDWARD M.FLETCHER,JR.
Attesting Officer

RENE D. TEGTMEYER
Acting Commissioner of Patents